United States Patent [19]

Austin, Jr.

[11] E Re. 28,649

[45] Reissued Dec. 16, 1975

[54] DENTAL HANDPIECE CONTROL

[76] Inventor: George K. Austin, Jr., P.O. Box 209, Rte. 2, Box 254, Newberg, Oreg. 97132

[22] Filed: Sept. 27, 1974

[21] Appl. No.: 510,042

Related U.S. Patent Documents

Reissue of:

[64] Patent No.: 3,638,310
Issued: Feb. 1, 1972
Appl. No.: 869,088
Filed: Oct. 24, 1969

[52] U.S. Cl. ..... 32/22
[51] Int. Cl.[2] ..... A61C 9/00
[58] Field of Search ..... 32/22; 222/74; 128/173.1; 251/331, 61; 73/422; 137/594, 652, 635, 144

[56] References Cited

UNITED STATES PATENTS

| | | | |
|---|---|---|---|
| 3,036,804 | 5/1962 | Staunt | 32/32 |
| 3,049,805 | 8/1962 | Liedberg et al. | 32/22 |
| 3,280,458 | 10/1966 | Deeley | 32/22 |
| 3,514,171 | 5/1970 | McGaha | 32/22 X |

*Primary Examiner*—Robert Peshock
*Attorney, Agent, or Firm*—Klarquist, Sparkman, Campbell, Leigh, Hall & Whinston

[57] ABSTRACT

A plurality of module control block assemblies individually control to a plurality of dental handpieces the supplies of drive air to the handpiece motors, and air and water coolants, and also supply drive air pressure to a gauge. The control block assemblies are clamped in series between distributing end blocks. A hanger assembly normally adapted to actuate a control block assembly when a handpiece is lifted from the hanger assembly has a manually operable lockout lever which prevents such actuation to permit changing of burrs of the handpiece or to inactivate that control block assembly.

18 Claims, 6 Drawing Figures

FIG. 4
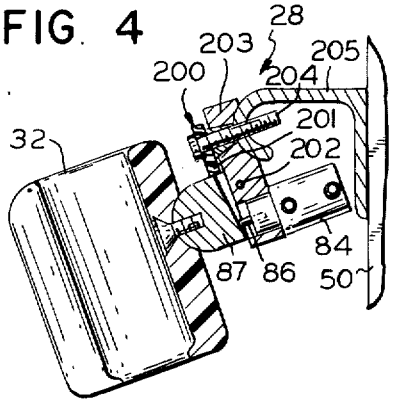
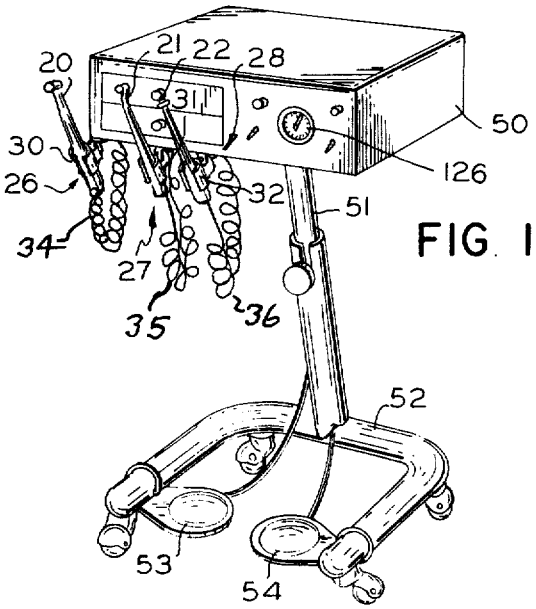
FIG. 1
FIG. 3
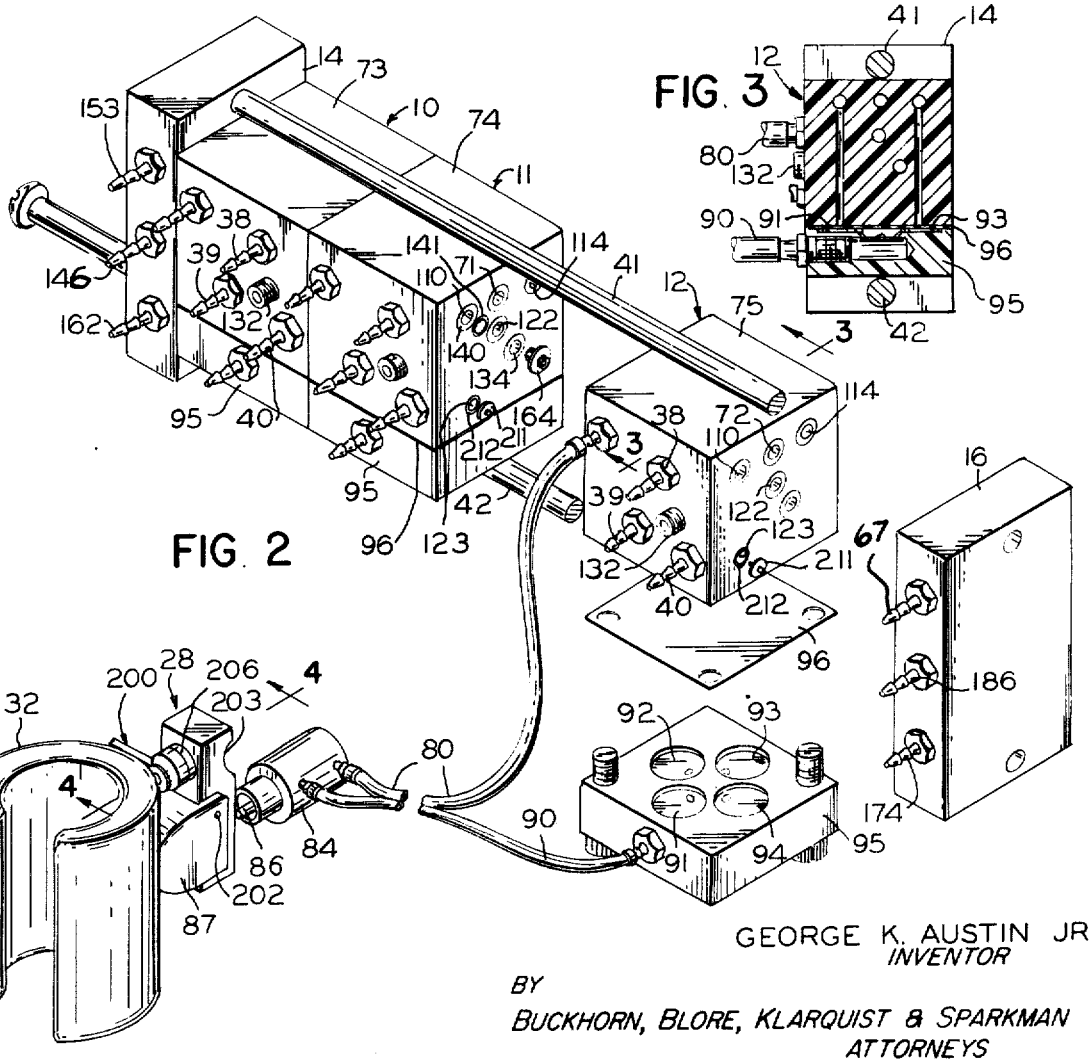
FIG. 2
GEORGE K. AUSTIN JR
*INVENTOR*
*BY*
*BUCKHORN, BLORE, KLARQUIST & SPARKMAN*
*ATTORNEYS*

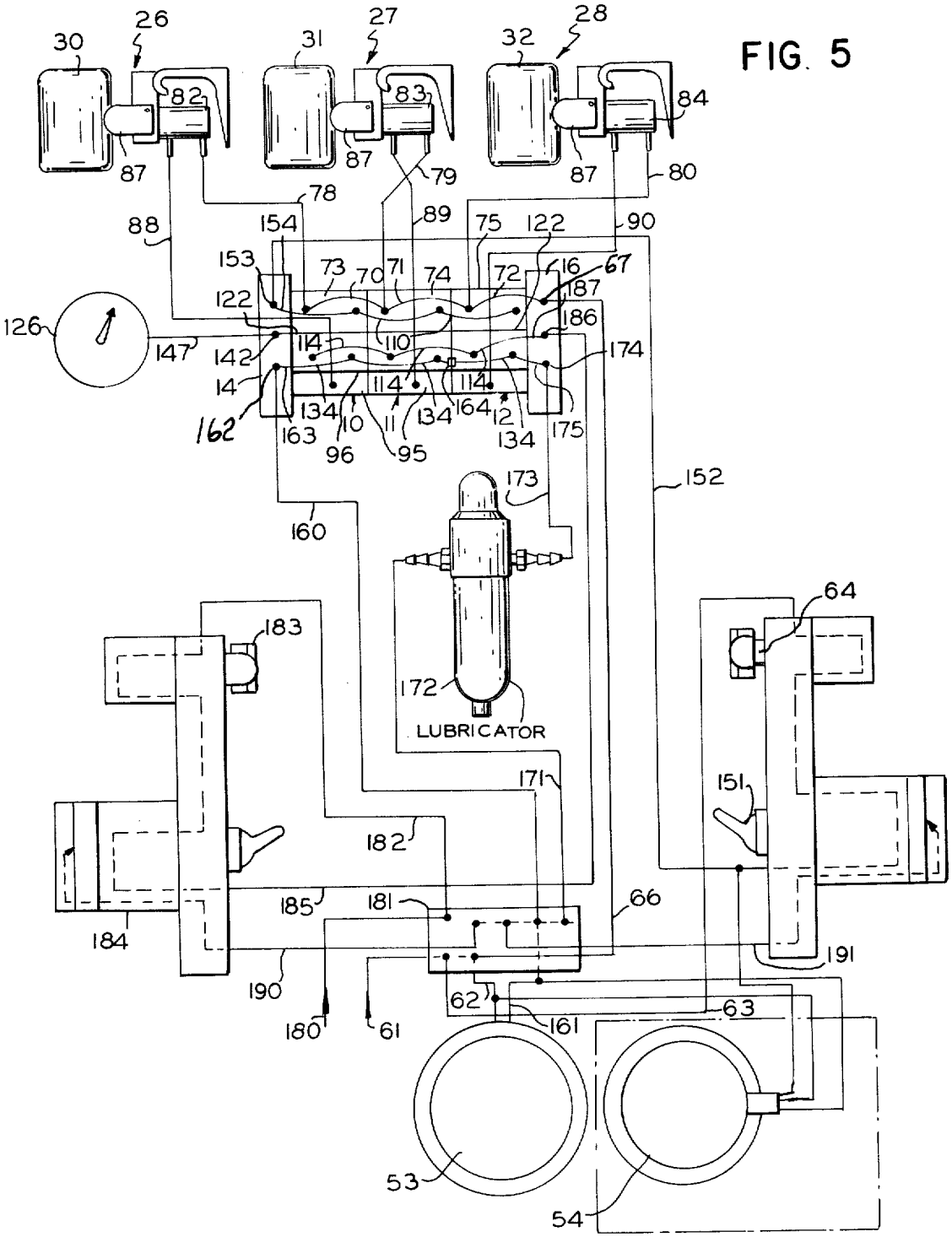
GEORGE K. AUSTIN, JR
*INVENTOR*
*BY*
*BUCKHORN, BLORE, KLARQUIST & SPARKMAN*
*ATTORNEYS*

GEORGE K. AUSTIN, JR
*INVENTOR*

*BY*

*BUCKHORN, BLORE, KLARQUIST & SPARKMAN*
*ATTORNEYS*

DENTAL HANDPIECE CONTROL

Matter enclosed in heavy brackets[ ]appears in the original patent but forms no part of this reissue specification; matter printed in italics indicates the additions made by reissue.

DESCRIPTION

This invention relates to a dental handpiece control, and more particularly to a module type dental handpiece control.

An object of the invention is to provide a new and improved dental handpiece control.

Another object of the invention is to provide a module type dental handpiece control.

A further object of the invention is to provide a simplified dental handpiece control.

Another object is to provide a dental handpiece control in which a plurality of control block assemblies positioned in a building block arrangement each serves to control drive air and coolants to one of a plurality of dental handpieces, it being possible to add additional control blocks to the arrangement or to subtract one or more control blocks from the arrangement.

Another object of the invention is to provide a control block assembly in which supply and discharge passages open on one face of a control block and a diaphragm sheet on said face may be selectively actuated to close the passage or to open passages to each other.

Another object of the invention is to provide a dental handpiece control having a control block assembly adapted to close or open lines of drive air and coolants to a dental handpiece under the control of a hanger assembly adapted to store the handpiece when not in use.

Another object of the invention is to provide a dental handpiece hanger assembly adapted to control the supplies of drive air and coolants and adapted to be locked out when desired.

In the drawings:

FIG. 1 is a perspective view of a dental cart having a dental handpiece control forming one embodiment of the invention;

FIG. 2 is an enlarged perspective view of the handpiece control of FIG. 1;

FIG. 3 is an enlarged vertical sectional view taken along line 3—3 of FIG. 2;

FIG. 4 is an enlarged vertical sectional view taken along line 4—4 of FIG. 2;

FIG. 5 is a schematic view of the control circuitry of the dental handpiece control of FIG. 1.

Figure 6:
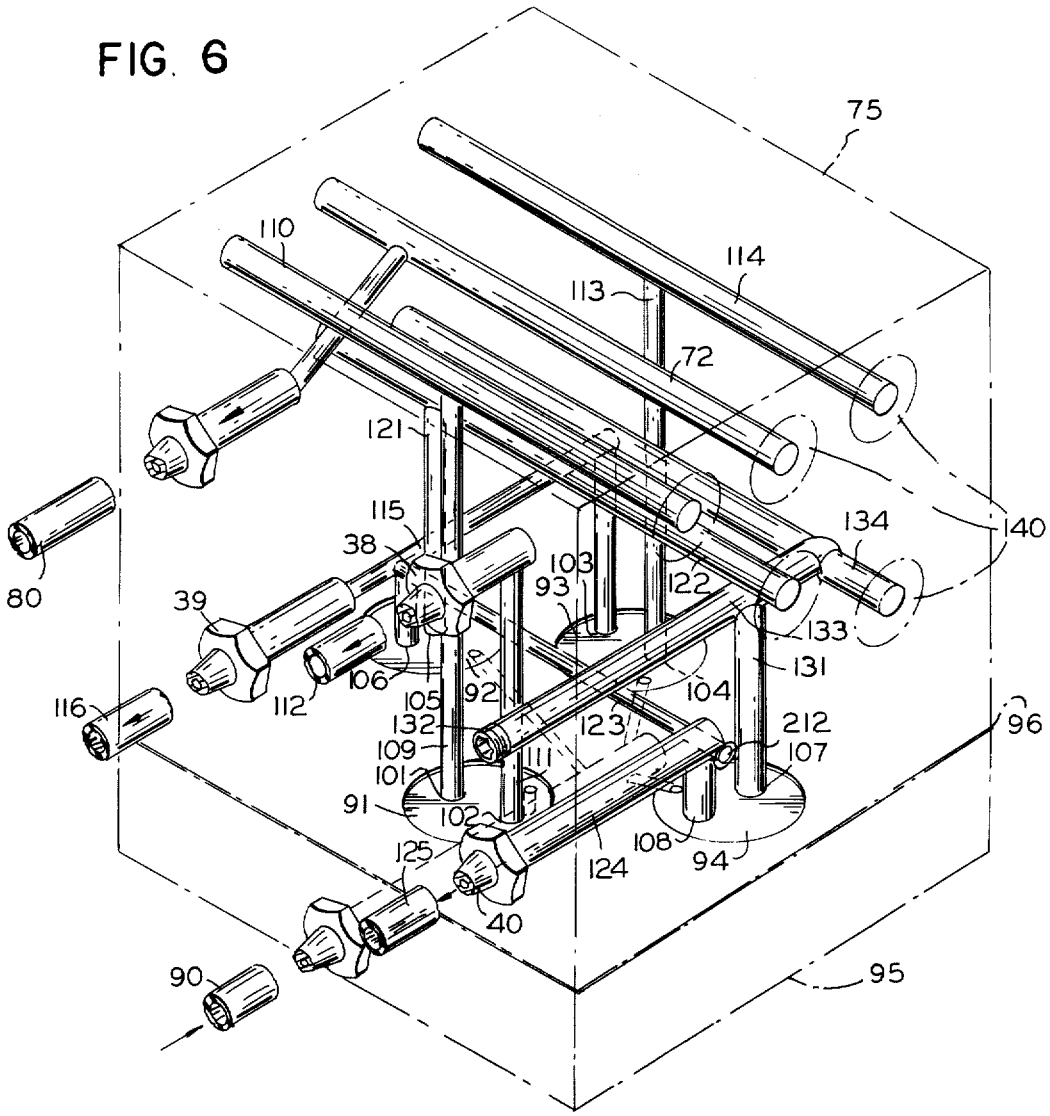
FIG. 6 is a perspective, schematic view of a block assembly of the dental handpiece control of FIG. 1.

Referring now in detail to the drawings, there is shown therein a dental handpiece control forming one embodiment of the invention and including module control blocks 10, 11 and 12 (FIG. 2) mounted in series between end blocks 14 and 16 and serving to control the supply of drive air, cooling air and cooling water to handpieces 20, 21 and 22 in cooperation with hanger assemblies 26, 27 and 28, which include hangers 30, 31 and 32 for the handpieces and also serve as actuators to cause the control block assemblies to supply air and/or water to the handpieces when the handpieces are lifted from the hangers and to cause the control block assemblies to shut off air and water from the handpieces when the handpieces are stored in the hangers. Multipassage, retractible, flexible conduits 34, 35 and 36 each lead from connectors 38, 39 and 40 of the control block assemblies. Tie rods 41 and 42 clamp the assemblies 10, 11, 12, 14 and 15 together into a unit, which is mounted inside a desk or tray 50 supported by a cart post 51 carried by a wheeled cart base 52 carrying foot controls 53 and 54. The hanger assemblies 28, 29 and 30 are mounted on the front of the desk 50. The handpieces are well known and include selectively operable valves for the drive air, cooling water and cooling air.

The circuitry of the dental handpiece control is shown in FIG. 5, and includes an air supply line 61 leading from a source of air under pressure (not shown) to a line 62 to the foot control 53, a line 63 leading to an adjustable needle valve 64 and to a line 66 to a connector 67 of the end block 16. The line 66 and connector 67 supply air to series connected passages 70, 71 and 72 in blocks 73, 74 and 75, which are connected to hoses 78, 79 and 80 leading to known hanger valve assemblies 82, 83 and 84. Valve stems 86 (FIG. 4) of the hanger valve assemblies are engaged and pushed in or actuated by hinge blocks 87 when the handpieces are resting in the hangers 30, 31 and 32 and push out to released positions when the handpieces are removed from the hangers. When any one of the handpieces is removed from the hanger, the valve assembly 82, 83 or 84 blocks off the hose 78, 79 or 80 from a hose 88, 89 or 90 and relieves air pressure in the hoses 88, 89 or 90 to relieve air pressure in diaphragm chambers 91, 92, 93 and 94 in control block covers 95 of the control block assemblies 10, 11 and 12. This permits diaphragm portions of a flexible sheet 96 serving to seal the covers 95 to the blocks 73, 74 and 75, which are identical, to permit flow of fluids between the two ports of each pair of pairs of ports 101 and 102, 103 and 104, 105 and 106, and 107 and 108. The port 101 then supplies air coolant from passages 109 and 110 in the block 75 to the port 102, a passage 111 in the block 75, the connector 38 and a hose 112 to the handpiece associated with that control block assembly. The port 104 then supplies water coolant from passages 113 and 114 in the block 75 to passage 115, the connector 39, which is screwed into the outlet of passage 115, and hose 116 leading to the handpiece. The port 105 leads to gauge air passages 121 and 122 in the block 75, and receives drive air from the port 106, from passages 123 and 124 in the [clock] *block* 75, the connector 40 and a hose 125 leading to the handpiece so that a gauge 126 connected to the passages 122, which are in series, gives the drive air pressure. The port 107 supplies drive air from a passage 131, a needle valve 132 threadedly adjustable from the front of the block 75, and drive air passages 133 and 134 in the block 75.

The right-hand ends of the blocks 14 and the blocks 73, 74 and 75, which are identical, as viewed in FIG. 2, have shallow counterbores 140 in which O-rings 141 seat. When the [clocks] *blocks* are clamped together, the O-rings seal the junctures of the aligned passages 110, the aligned passages 70, 71 and 72, the aligned passages 114, the aligned passages 122 and the aligned passages 134, the left-hand ends of the blocks 73, 74 and 75 and the block 16 being planar and compressing the O-rings. Similar seals (not shown) are provided between the end blocks 14 and 16 and the blocks 73 and 75. An L-shaped passage 142 (FIG. 5), a connector 146 (FIG. 2) and a hose 147 (FIG. 5) connect the passages 122 to the air gauge 126.

The hose 63 (FIG. 5) supplies the coolant air to the needle valve 64 and the air through a manually operable, toggle-type, shutoff valve 151 to a hose 152 leading to a connector 153, an L-shaped passage 154 in end block 14 and the air coolant passages 110. A hose 160 connected to drive air outlet hose 161 of the foot control 53 is connected by a connector 162 and an L-shaped passage 163 to the passages 134 in the blocks 73 and 74, a plastic plug 164 being positioned between and blocking the adjacent ends of the passages 134 in the blocks 74 and 75 to supply nonlubricated air to the handpieces 20 and 21. Lubricated air is supplied to the handpiece 22 (FIG. 1) from the hose 161 (FIG. 5), a hose 171, a lubricator 172, a hose 173, a connector 174 of the block 16, an L-shaped passage 175 in the block 16 and the passage 134 in the block 75.

Coolant water is supplied from a source under pressure (not shown) through hose 180, distributor block 181, hose 182, manually adjustable needle valve 183, toggle-type shutoff valve 184, hose 185, connector 186, L-shaped passage 187 in the end block 16, and the coolant water passages 114 in the blocks 73, 74 and 75. The valves 151 and 184 are relay-type valves with operating force being supplied by air hoses 190 and 191 connected to the hose 161. The control 54 is provided to supply coolant air to the handpieces without supplying drive air thereto.

In order to lock the hinge blocks 87 down, a lockout lever 200 (FIGS. 2 and 4) having an eccentric or cam portion 201 may be swung from an upright, retracted position to a horizontal, locking position preventing upward movement of the hinge block. The hinge block is mounted on a pin 202 carried by hanger block 203 fixed by screw 204 to bracket 205 fastened to the desk 50. The screw holds bushing 206 in a countersunk hole in the block and presses the block tightly against the bracket, the screw being screwed into a tapped bore in the bracket. The lockout lever 200 is of plastic and frictionally engages the screw to remain in adjusted position, the lever being mounted rotatably on the screw.

Plugs 211 are pressed into bores 123 and shallow counterbores 212 to seal off the ends of the bores or passages 104. These ends of the bores are open at the right-hand faces of the blocks 73, 74 and 75, as viewed in FIG. 2, to permit the passages 123 to be formed by boring.

I claim:

1. In a dental handpiece control, a solid control block having a drive air passage therethrough having an inlet and an outlet and a cooling fluid passage extending therethrough having an inlet and an outlet, a diaphragm sheet positioned on a first face of the control block, cover means secured to the outer face of the diaphragm sheet and the first face of the control block and having a pair of diaphragm actuating chambers therein, the drive air passage having a pair of ports intermediate the inlet and outlet thereof and opening into *a portion of said first face opposite* one of the diaphragm chambers and adapted to be closed by the diaphragm sheet, the cooling fluid passage having a pair of ports intermediate the inlet and outlet thereof and opening into [the other of] *a portion of said first face opposite* the diaphragm chambers and adapted to be closed by the diaphragm sheet, an air driven dental handpiece, air supply means supplying drive air under pressure to the inlet of the drive air passage, cooling fluid supply means supplying a cooling fluid under pressure to the inlet of the cooling fluid passage, air conduit means connecting the outlet of the drive air passage to the handpiece, cooling fluid conduit means connecting the outlet of the cooling fluid passage to the handpiece,

*second fluid supply means for supplying fluid under pressure to the diaphragm chambers,*

*valve means in said second fluid supply means for controlling the supply of fluid to said diaphragm chambers,*

*and* hanger means serving to releasably support the handpiece *and operatively connected to and controlling the valve means* and operable by the weight of the handpiece [to close the valves and operable] *when the handpiece is positioned on the hanger means* to open the [valves] *valve means to permit fluid under pressure to flow to the diaphragm chambers thus to cause said diaphragm sheet to be pressed against said first face and prevent flow of air and cooling fluid through the respective passages therefor and operable* when the handpiece is lifted therefrom [,] *to close the valve means to shut off flow of fluid under pressure to the diaphragm chambers thus to permit movement of said diaphragm sheet away from said first face and permit flow of air cooling fluid through the respective passages therefor.* [and means under the control of the hanger means for supplying fluid under pressure to the diaphragm chambers.]

2. The dental handpiece control of claim 1 wherein the inlets open on a second face of the block and the outlets open on a third face of the block.

3. The dental handpiece control of claim 2 wherein the portions of the inlet passages on the inlet sides of the diaphragm sheet each is T-shaped with the stem of the T leading to the diaphragm sheet and the other portion leading from the second face of the block to a fourth face of the block.

4. The dental handpiece control of claim 1 wherein the hanger means includes a pivotal hanger adapted to hold the handpiece and pivotal downwardly to a storage position from the weight of the handpiece, means urging the hanger to an upper released position when the handpiece is out of the hanger, *the* valve means *being* operable by the hanger when in its storage position for supplying fluid under pressure to the diaphragm chambers and to exhaust the diaphragm chambers when the hanger is in its released position, and manually operable means for locking the hanger in its storage position.

5. The handpiece control of claim 4 wherein the manually operable means is a lockout lever having a cam portion adapted to hold the hanger in its storage position.

6. The dental handpiece of claim 5 wherein the hanger means includes a mounting bracket, a mounting block mounting the hanger pivotally and a screw securing the mounting block to the bracket and pivotally mounting the lockout lever, the mounting block serving to support the valve means.

7. In a dental handpiece control, a plurality of dental handpieces, a plurality of valving assemblies one for each handpiece, means mounting the valving assemblies together in a stack, the valving assemblies each including a plurality of fluid supply passages connected in series to corresponding fluid supply passages in the valving assemblies stacked adjacent thereto for supplying fluid to the valving assemblies, means for supplying a plurality of fluids to each of the valving assemblies, and a plurality of conduit means connecting each valving assembly to one of the handpieces for supplying fluids to the handpieces.

8. The dental handpiece control of claim 7 wherein each valving assembly includes a block in which the supply passages are straight bores aligned with the bores in the immediately adjacent blocks, the blocks being mounted in face-to-face relationship with the bores aligned.

9. The dental handpiece of claim 8 wherein the blocks have shallow counterbores at the ends of the supply passages, and O-ring seals mounted in and compressed in the counterbores.

10. The dental handpiece of claim 8 including plug means positioned in the adjacent ends of two of the supply passages.

11. The dental handpiece control of claim 7 including an end block having L-shaped fluid passages therein having one end of each connected to the supply passages of the control blocks immediately adjacent thereto.

12. In a control, a control block having a first fluid passage having a bore extending from a first face to a port at a second face and a branch extending from the bore to a third face, the control block also having a second fluid passage having a drive air bore extending from the first face to the second face and a second fluid branch extending from the drive air bore to a port at the third face, the control block also including a first fluid outlet passage leading from a port at the third face near the port of the branch of the first fluid passage, the control block also including a second fluid outlet passage leading from a port at the third face near the port of the branch of the second fluid passage, flexible diaphragm means covering the ports in the third face and movable under pressure away from the ports, diaphragm chamber means defining a first diaphragm chamber opposite the ports of the fluid branch and the first fluid outlet passage and covering a first portion of the flexible diaphragm means and also defining a second diaphragm chamber opposite the ports of the branch of the second fluid passage and the second fluid outlet passage and covering a second portion of the flexible diaphragm means, and selectively operable means for supplying fluid under pressure to the diaphragm chambers to press the diaphragm means against the ports and close the ports from each other.

13. The control of claim 12 wherein the first face and the second face are at opposite sides of the block.

14. The control of claim 12 wherein the diaphragm chamber means is a cover adapted to cover the third face of the block and having recesses in the face thereof adjacent the diaphragm means and defining the diaphragm chambers.

15. The control of claim 14 wherein the cover is a block member having blind bores defining the recesses and including control fluid passage means to the bores.

16. The control of claim 15 wherein the control fluid passage means includes a main passage leading from one face of the block member and branch passages leading from the main passage to the blind bores.

[17. In a control, a block having a fluid supply passage and a fluid discharge passage therethrough, the passages having adjacent ports at one face of the block, flexible diaphragm means covering the adjacent ports, and diaphragm cover means defining a diaphragm chamber opposite the adjacent ports and adapted to selectively receive fluid under pressure to press the diaphragm means to a position closing the ports.]

[18. The control of claim 17 wherein the diaphragm means comprises a sheet of flexible material.]

[19. The control of claim 18 wherein the diaphragm cover means comprises a diaphragm block having the diaphragm chamber therein.]

20. In a control, a plurality of solid control blocks secured together in face-to-face relationship, each of the control blocks having first passages opening into passages in an immediately adjacent one of the control blocks, gasket means between the blocks sealing the areas around the junctures of the passages, a plurality of diaphragm means mounted on the blocks, the first passages having laterally extending branches having ports opening to the diaphragm means, and a plurality of additional passages in the blocks having ports adjacent the ports of the first passages and opening to the diaphragm means, each diaphragm means being adapted when in one position to press against the adjacent ports and close them from each other and wherein a second position to permit flow from one of the last-mentioned ports to the other.

21. The control of claim 20 including end blocks secured to the control blocks and including passages communicating with the first passages.

* * * * *

UNITED STATES PATENT OFFICE

CERTIFICATE OF CORRECTION

Patent No. RE-28649 Dated December 16, 1975

Inventor(s) GEORGE K. AUSTIN, JR.

It is certified that error appears in the above-identified patent and that said Letters Patent are hereby corrected as shown below:

Column 4, line 31, after "air" insert --and--

Signed and Sealed this

*twenty-second* Day of *June 1976*

[SEAL]

*Attest:*

RUTH C. MASON
*Attesting Officer*

C. MARSHALL DANN
*Commissioner of Patents and Trademarks*